US010553919B2

(12) United States Patent
Choi et al.

(10) Patent No.: US 10,553,919 B2
(45) Date of Patent: Feb. 4, 2020

(54) BATTERY MODULE WITH IMPROVED COOLING PERFORMANCE

(71) Applicants: Hyundai Motor Company, Seoul (KR); Kia Motors Corporation, Seoul (KR)

(72) Inventors: Yong Hwan Choi, Gyeonggi-do (KR); Hae Kyu Lim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 162 days.

(21) Appl. No.: 15/811,168

(22) Filed: Nov. 13, 2017

(65) Prior Publication Data

US 2018/0269544 A1   Sep. 20, 2018

(30) Foreign Application Priority Data

Mar. 20, 2017   (KR) .................. 10-2017-0034719

(51) Int. Cl.
| | |
|---|---|
| *H01M 10/6556* | (2014.01) |
| *H01M 10/6555* | (2014.01) |
| *H01M 10/613* | (2014.01) |
| *H01M 2/10* | (2006.01) |
| *H01M 10/0525* | (2010.01) |
| *H01M 10/623* | (2014.01) |

(52) U.S. Cl.
CPC ....... *H01M 10/613* (2015.04); *H01M 2/1016* (2013.01); *H01M 10/0525* (2013.01); *H01M 10/623* (2015.04); *H01M 10/6555* (2015.04); *H01M 10/6556* (2015.04)

(58) Field of Classification Search
None
See application file for complete search history.

(56) References Cited

U.S. PATENT DOCUMENTS

| 8,343,650 | B2 * | 1/2013 | Raiser ................ | H01M 2/0207 429/120 |
| 8,679,669 | B2 | 3/2014 | Lee et al. | |
| 2012/0177965 | A1 * | 7/2012 | Lee ..................... | H01M 10/625 429/99 |
| 2014/0099527 | A1 * | 4/2014 | Seong ................. | H01M 2/1077 429/120 |

FOREIGN PATENT DOCUMENTS

| DE | 102017215982 | * | 3/2019 |
| KR | 10-1560217 B1 | | 10/2015 |
| KR | 2016-0115582 A | | 10/2016 |

* cited by examiner

*Primary Examiner* — Jonathan Crepeau
(74) *Attorney, Agent, or Firm* — Mintz Levin Cohn Ferris Glovsky and Popeo, P.C.; Peter F. Corless

(57) ABSTRACT

A battery module is provided. The battery module includes a battery stack that has a plurality of secondary batteries stacked on each other in multiple stages along a predetermined stack direction. Additionally, the battery module includes at least one cooling fin which has a contact part disposed to contact at least one of the secondary batteries and a fitting part that extends from the contact part to expose at least a portion of the fitting part to the exterior of the battery stack. A cooling channel which has at least one fitting groove is provided and the fitting part is fitted into the fitting groove.

9 Claims, 3 Drawing Sheets

BATTERY MODULE WITH IMPROVED COOLING PERFORMANCE

CROSS-REFERENCE TO RELATED APPLICATION

This application is based on and claims the benefit of priority to Korean Patent Application No. 10-2017-0034719, filed on Mar. 20, 2017, in the Korean Intellectual Property Office, the disclosure of which is incorporated herein in its entirety by reference.

Technical Field

The present disclosure relates to a battery module, and more particularly, to a battery module that has an improved structure of effectively cool secondary batteries.

Background

In recent years, demands of portable electronic devices such as a laptop computer, a video camera and a portable telephone have increased, and an electric vehicle, a storage battery for energy storage, a robot, a satellite and the like have been developed. Accordingly, research has been actively conducted regarding a high performance secondary battery capable of repeated charging and discharging.

Examples of a currently commercialized secondary battery include a nickel-cadmium battery, a nickel-hydrogen battery, a nickel-zinc battery, a lithium secondary battery and the like. In particular, the lithium secondary battery has been spotlighted due to advantages that charging/discharging is free since a memory effect scarcely occurs compared to a nickel-based secondary battery, a self-discharge rate is very low, and an energy density is high.

In such a lithium secondary battery, a lithium oxide and a carbon are mainly used as a positive electrode active material and a negative electrode active material, respectively. The lithium secondary battery includes an electrode assembly that has a positive electrode plate and a negative electrode plate, to which the positive electrode active material and the negative electrode active material are applied, respectively, with a separator interposed therebetween, and an exterior material, that is, a battery case, configured to seal and accommodate the electrode assembly together with an electrolyte.

In general, the lithium secondary battery may be classified into a can-type secondary battery in which an electrode assembly is embedded in a metal can and a pouch-type secondary battery in which an electrode assembly is embedded in an aluminum laminate sheet, according to a shape of the external material. In recent years, the secondary battery has been widely used even in larger devices such as a vehicle and an energy storage system as well as smaller devices such as a portable electronic device. A battery module in which a plurality of secondary batteries are electrically connected to each other to improve a capacity and an output thereof is used in larger devices. Since such a battery module is manufactured in a form in which a plurality of secondary batteries are densely arranged in a narrow space, effective cooling performance should be secured.

SUMMARY

The present disclosure provides a battery module having an improved structure to more effectively cool secondary batteries. The technical objects of the present disclosure are not limited to the above-mentioned one, and the other unmentioned technical objects will become apparent to those skilled in the art from the following description.

In accordance with an aspect of the present disclosure, a battery module may include a battery stack having a plurality of secondary batteries stacked on each other in multiple stages along a predetermined stack direction, at least one cooling fin having a contact part arranged to contact at least one of the secondary batteries and a fitting part that extends from the contact part with at least a portion of the fitting part exposed to the exterior of the battery stack, and a cooling channel having at least one fitting groove with which the fitting part is fitted.

Further, the contact part may be interposed between a pair of secondary batteries arranged to be adjacent to each other among the secondary batteries. The fitting groove may be formed on a first surface of the cooling channel, which faces the battery stack. Additionally, the cooling channel may further include at least one anti-deformation groove formed on a second surface of the cooling channel that is opposite to the first surface and having a shape symmetrical to the fitting groove. The fitting groove and the anti-deformation groove may be formed alternately along the stack direction.

The fitting groove may also have at least one first inclined surface formed at an end of the fitting groove, which is connected to the first surface of the cooling channel, to be inclined, and the anti-deformation groove may have at least one second inclined surface formed at an end of the anti-deformation groove, which is connected to the second surface of the cooling channel, to be inclined. Further, the battery module may include a plurality of cartridges that accommodate at least one of the secondary batteries, respectively, and stacked on each other in multiple stages along the stack direction. At least a portion of the fitting part may pass through any one of the cartridges to extend to the exterior of the battery stack. The fitting part may pass between a pair of cartridges arranged to be adjacent to each other among the cartridges to extend to the exterior of the battery stack.

The cooling channel may be arranged extraneous to the battery stack to contact the cartridges. The battery module may further include a fastening member configured to fasten the cooling channel and the fitting part to each other such that the fitting groove abuts the fitting part. In particular, the fastening member may have a long bolt by which the cooling channel and the fitting part are screw-coupled to each other. The battery module may further include at least one end plate arranged extraneous to the battery stack, the end plate may have a fastening part that extends to be located on the same line as the fitting part, and the long bolt screw-couples the cooling channel, the fitting part, and the fastening part to each other.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
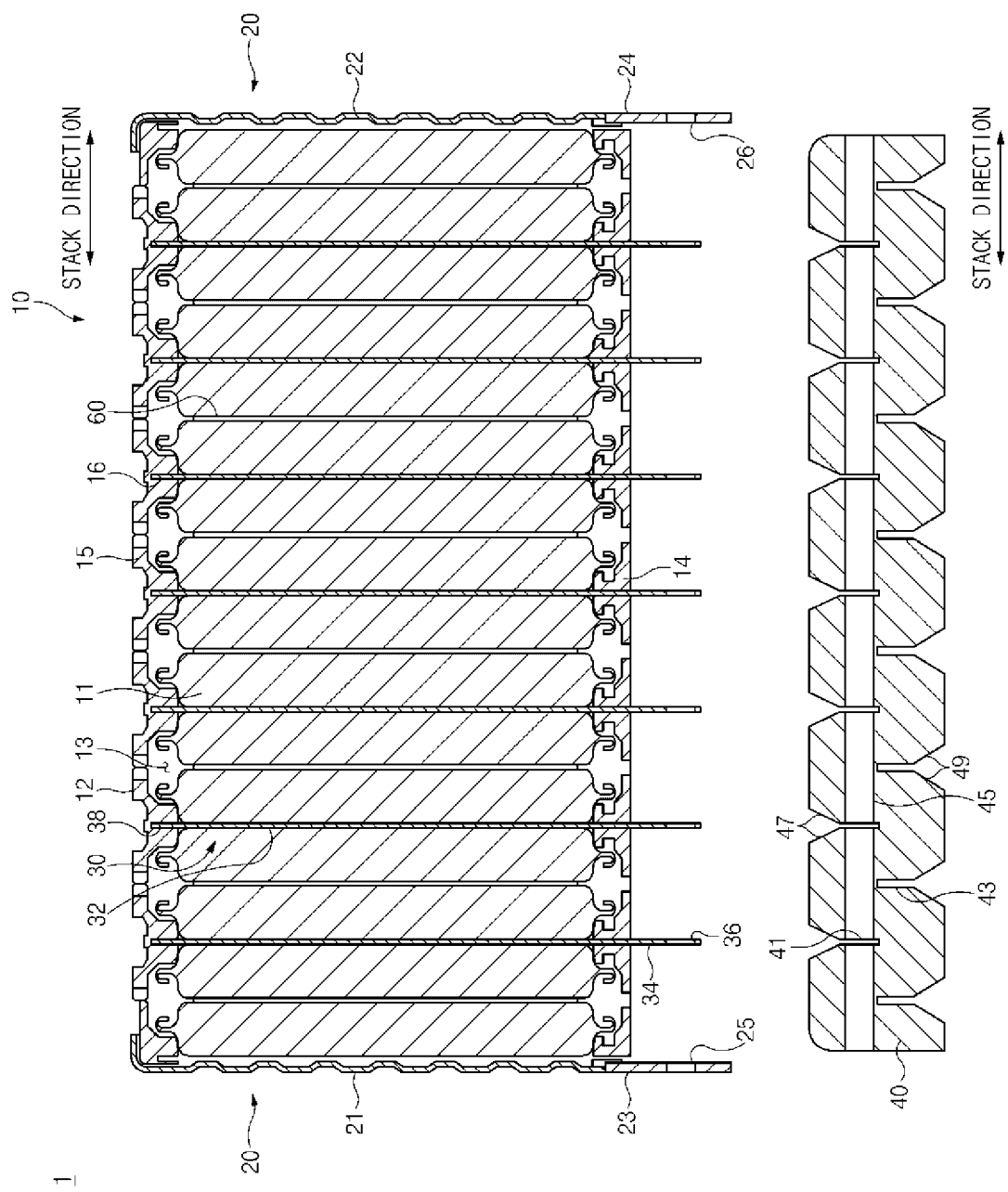
FIG. 1 is a view illustrating a state in which cooling fins and a cooling channel are separated from each other in a battery module according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, some exemplary embodiments of the present disclosure will be described in detail with reference to the accompanying drawings. It should be noted that when components in the drawings are designated by reference numerals, the same components have the same reference numerals as far as possible even though the components are illustrated in different drawings. Further, in the description of the exemplary embodiments of the present disclosure, when it is determined that detailed descriptions of well-known configurations or functions disturb understanding of the exemplary embodiments of the present disclosure, the detailed descriptions will be omitted.

Additionally, in the description of the exemplary embodiments of the present disclosure, the terms such as first, second, A, B, (a) and (b) may be used. Each of the terms is merely used to distinguish the corresponding component from other components, and does not delimit an essence, an order or a sequence of the corresponding component. Further, all terms used herein, including technical terms and scientific terms, may have the same meanings as those generally understood by those skilled in the art to which the present disclosure pertains as long as the terms are differently defined. The terms defined in a generally used dictionary should be interpreted to have the same meanings as those in the context of the related art, and are not interpreted as ideal or excessively formal meanings as long as the terms are not clearly defined in the present application.

Figure 2:
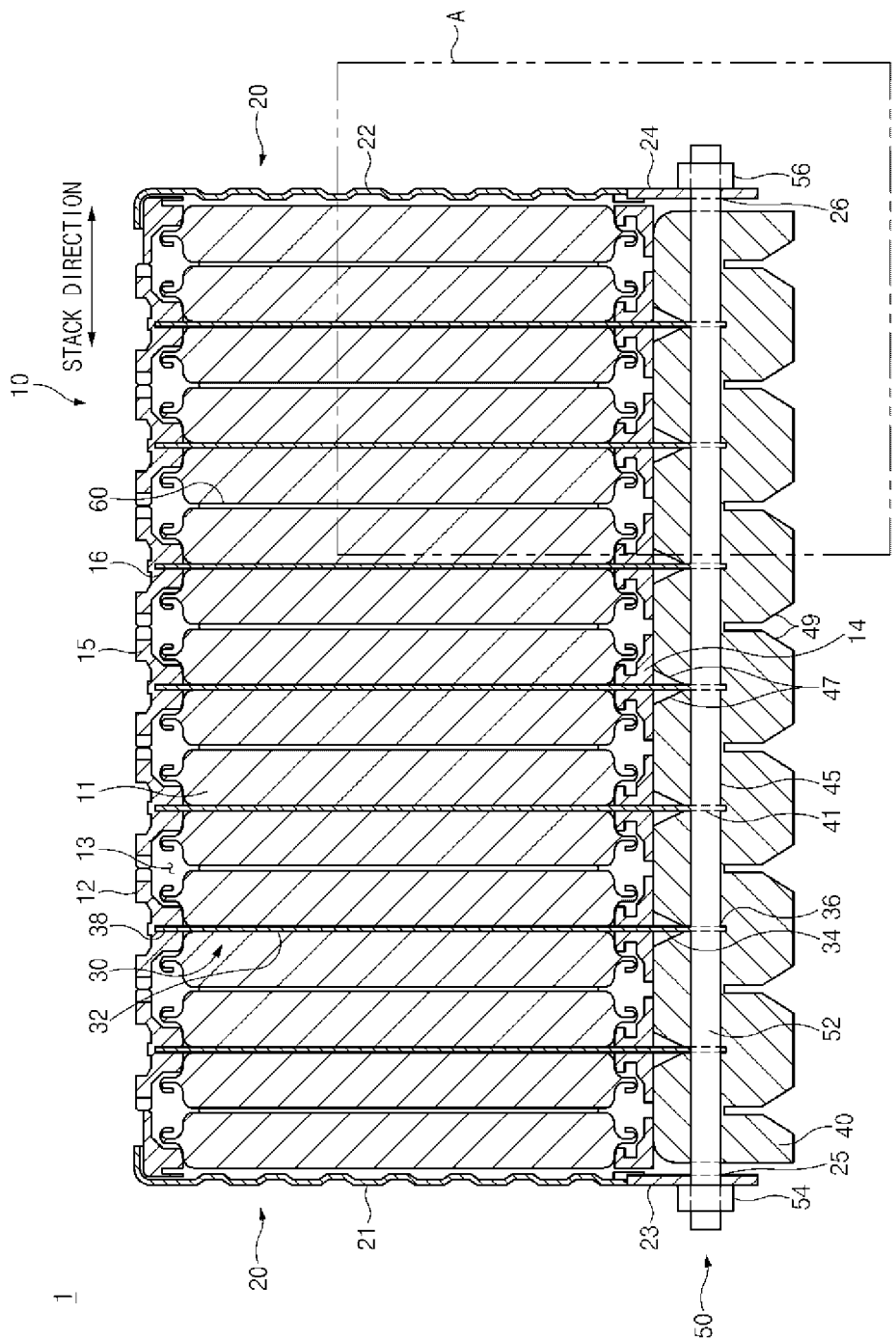
FIG. 2 is a view illustrating a state in which the cooling fins and the cooling channel are coupled to each other in the battery module of FIG. 1 according to an exemplary embodiment of the present disclosure.
Figure 3:
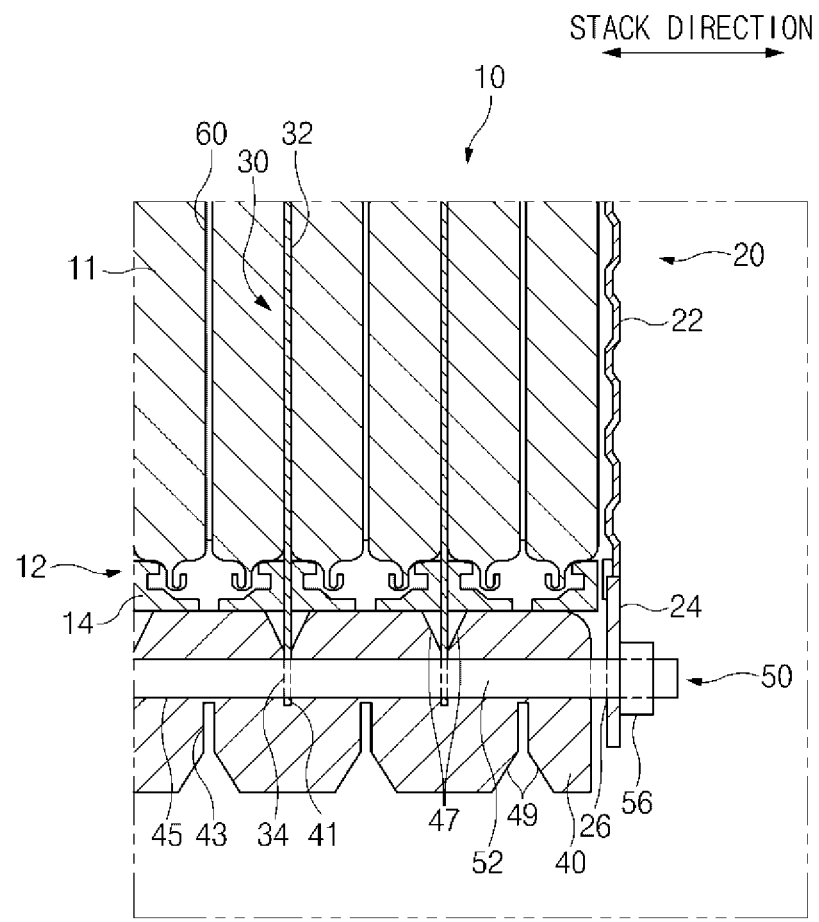
FIG. 3 is a partially enlarged view illustrating area A of FIG. 2 according to an exemplary embodiment of the present disclosure.

FIG. 1 is a view illustrating a state in which cooling fins and a cooling channel are separated from each other in a battery module according to an exemplary embodiment of the present disclosure, FIG. 2 is a view illustrating a state in which the cooling fins and the cooling channel are coupled to each other in the battery module of FIG. 1, and FIG. 3 is a partially enlarged view illustrating area A of FIG. 2.

Referring to FIGS. 1 and 2, a battery module 1 according to an exemplary embodiment of the present disclosure may include a battery stack 10 in which secondary batteries 11 and cartridges 12 are stacked on each other in multiple stages, an end plate 20 configured to reinforce the rigidity of the battery stack 10, cooling fins 30 in thermal contact with the secondary batteries 11, a cooling channel 40 configured to dissipate heat transferred by the cooling fins 30, and a fastening member 50 configured to fasten the cooling fins 30 and the cooling channel 40 to each other.

In particular, the battery stack 10 may include the plurality of secondary batteries 11 and the plurality of cartridges 12 accommodating at least one of the secondary batteries 11. Each of the secondary batteries 11 may include an electrode assembly (not illustrated), an electrolyte (not illustrated) and a case (not illustrated). The electrode assembly may include at least one positive electrode plate, at least one negative electrode plate, and a separator interposed therebetween. However, since such a configuration of the secondary batteries 11 is well-known in the technical field to which the present disclosure pertains, detailed descriptions thereof will be omitted. As illustrated in FIG. 1, the secondary batteries 11 may be pouch-type secondary batteries having pouch-type cases; however, the present disclosure is not limited thereto. The secondary batteries 11 may be also can-type secondary batteries having can-type cases.

Further, as illustrated in FIG. 1, the cartridges 12 may be stacked on each other in multiple stages along a predetermined stack direction. At least one secondary battery 11 may be accommodated in an internal space 13 between the cartridges 12. For example, as illustrated in FIG. 1, a pair of secondary batteries 11 may be accommodated in the internal space 13 formed by combining a pair of cartridges 12 disposed adjacent to each other. Thus, as illustrated in FIG. 1, the secondary batteries 11 may be stacked on each other in multiples stages along the stack direction while being accommodated in the internal spaces 13 of the cartridges 12. Further, as illustrated in FIG. 1, the end plate 20 may include a first end plate 21 arranged on a first side of the battery stack 10 and a second end plate 22 arranged on a second side of the battery stack 10, wherein the second side of the battery stack 10 is opposite to the first side of the battery stack 10.

As illustrated in FIG. 2, the first end plate 21 and the second end plate 22 may include fastening parts 23 and 24 disposed on the same line as a portion of a fitting part 34 exposed to the exterior of the battery stack 10, respectively. As further illustrated in FIG. 2, the fastening parts 23 and 24 may include first bolt bores 25 and 26 (e.g., holes) perforated such that a substantially long bolt 52, which will be described below, may be fastened into the first bolt bores 25 and 26. The end plate 20 may be formed of a material having higher rigidity than that of the battery stack 10. Thus, the end plate 20 may reinforce the rigidity of the battery stack 10 to protect the battery stack 10.

Moreover, as illustrated in FIG. 1, each of the cooling fins 30 may include a contact part 32 disposed to be in contact with at least one of the secondary batteries 11 and a fitting part 34 that extends from the contact part 32 and thus, at least a portion of the fitting part 34 may be exposed to the exterior of the battery stack 10. The cooling fins 30 may be formed of metal having a high heat transfer coefficient, however, the present disclosure is not limited thereto.

The contact part 32 may be interposed between a pair of secondary batteries 11 disposed adjacent to each other. For example, as illustrated in FIG. 1, the contact part 32 may be interposed between the pair of secondary batteries 11 disposed in different internal spaces 13. Particularly, as illustrated in FIG. 1, a compression pad 60 may be interposed between a pair of secondary batteries 11 located in the same internal space 13, however, the present disclosure is not limited thereto.

The fitting part 34 may extend from a first end of the contact part 32 to expose at least a portion of the fitting part 34 to the exterior of the battery stack 10. For example, as illustrated in FIG. 1, the fitting part 34 may extend to exterior of the battery stack 10 and thus, at least a portion of the fitting part 34 passes through one edge 14 of any one of the cartridges 12. However, the present disclosure is not limited thereto. The fitting part 34 may extend to the exterior of the battery stack 10 to cause at least a portion of the fitting part 34 to pass between the pair of cartridges 12 disposed adjacent to each other among the cartridges 12.

As illustrated in FIG. 2, the fitting part 34 may include a second bolt bore 36 perforated along the stack direction to fasten the substantially long bolt 52, which will be described below, into the second bolt bore 36. Accordingly, as illustrated in FIG. 2, as the contact parts 32 and the fitting parts 34 are provided, the cooling fins 30 may be arranged along the stack direction at a predetermined interval such that the fitting parts 34 protrude from surfaces of the cartridges 12 to the exterior of the battery stack 10. The cooling fins 30 may be configured to receive heat generated by the secondary batteries 11 through the contact parts 32 to transfer the heat to the cooling channel 40, which will be described below, through the fitting parts 34.

Furthermore, as illustrated in FIG. 2, each of the cooling fins 30 may include a fixing part 38 that extends from an opposite end (e.g., the second end) of the contact part 32 to be fitted with an opposite edge 15 of the corresponding cartridge 12. Similarly, as illustrated in FIG. 2, each of the cartridges 12 may further include a fixing groove 16 formed on an inner surface of the opposite edge 15 to fit the fixing part 38 of the cooling fin 30 into the fixing groove 16. Thus, the cooling fins 30 may be fixed to the cartridges 12 through fitting between the fixing parts 38 and the fixing grooves 16.

The cooling channel 40 may include at least one fitting groove 41 into which the fitting part 34 of the cooling fin 30 may be fitted, at least one anti-deformation groove 43 configured to prevent the cooling channel 40 from being deformed, and third bolt bores 45 (e.g., holes) to which the substantially long bolt 52, which will be described below, may be fastened. Further, the cooling channel 40 may be formed of metal having a high heat transfer coefficient however, the present disclosure is not limited thereto. In addition, the cooling channel 40 may be elastically deformed with respect to the fitting grooves 41 and the anti-deformation grooves 43; however, the present disclosure is not limited thereto. As illustrated in FIG. 1, the fitting grooves 41 may be formed on one surface of the cooling channel 40, which faces the surfaces of the cartridges 12, along the stack direction at an interval that is to the same as the arrangement interval of the cooling fins 30.

Each of the fitting grooves 41 may have a width and a depth that correspond to the associated fitting part 34 and thus, the fitting part 34 may be fitted into the fitting groove 41. For example, the fitting groove 41 may have a width that is less than that of the fitting part 34. Then, the fitting part 34 and the fitting groove 41 may be in close contact with each other. For example, as illustrated in FIG. 2, the fitting grooves 41 may have a predetermined depth such that surfaces of the cartridges 12 and the first surface of the cooling channel 40 are in contact with each other (e.g., the surfaces abut each other) when the fitting parts 34 are fitted in the fitting grooves 41. The cooling channel 40 may be arranged extraneous to the battery stack 10 while in surface contact with the cartridges 12.

According to the fitting between the fitting part 34 and the fitting groove 41, which has been described above, even when the flatness of the fitting part 34 or the fitting groove 41 is low due to a processing error and the like, the fitting part 34 and the fitting groove 41 may be effectively in close contact with each other. Accordingly, heat generated by the secondary batteries 11 may be effectively transferred to the cooling channel 40 without interposing a thermal interface material (TIM) between the fitting part 34 and the fitting groove 41, and thus, costs consumed to apply the TIM may be reduced.

Further, according to the fitting between the fitting part 34 and the fitting groove 41, which has been described above, as illustrated in FIG. 3, opposite outer surfaces of the fitting part 34 and opposite inner surfaces of the fitting groove 41 are in close contact with each other (e.g., abutting contact). Accordingly, a thermal contact area between the cooling fins 30 and the cooling channel 40 may increase, and thus, the heat generated by the secondary batteries 11 may be more effectively transferred to the cooling channel 40. Further, according to the fitting between the fitting part 34 and the fitting groove 41, which has been described above, the first surface of the cooling channel 40 may come into contact with the surfaces of the cartridges 12, and thus, the heat generated by the secondary batteries 11 may be transferred to the cooling channel 40 even through the cartridges 12.

The fitting groove 41 may have at least one first inclined surface 47 formed at an end thereof connected to the first surface of the cooling channel 40 to be inclined. For example, as illustrated in FIG. 3, the fitting groove 41 may have a pair of first inclined surfaces 47 formed at upper ends of opposite inner surfaces thereof connected to the first surface of the cooling channel 40 to be inclined at a predetermined angle. The fitting groove 41 may have a "Y" shape due to the first inclined surfaces 47. The first inclined surfaces 47 may guide the fitting part 34 to facilitate the insertion of the fitting part 34 into the fitting groove 41.

As illustrated in FIG. 2, the anti-deformation grooves 43 may be formed on an opposite surface of the cooling channel 40, which is opposite to the first surface of the cooling channel 40, along the stack direction at an interval that is the same as the formation interval of the fitting grooves 41. For example, as illustrated in FIG. 2, the fitting grooves 41 and the anti-deformation grooves 43 may be formed alternately along the stack direction. The anti-deformation grooves 43 may be formed to have shapes that are symmetric to the fitting grooves 41, respectively. In other words, the anti-deformation grooves 43 may be formed to have a width and a depth that are about the same as that of the fitting grooves 41, respectively.

Additionally, each of the anti-deformation grooves 43 may have at least one second inclined surface 49 having a shape that is symmetric to the first inclined surface 47. For example, as illustrated in FIG. 3, the anti-deformation groove 43 may have a pair of second inclined surfaces 49 formed at lower ends of opposite inner surfaces thereof connected to the second surface of the cooling channel 40 (e.g., the opposite surface to the first surface of the cooling channel 40) to be inclined at a predetermined angle. The anti-deformation groove 43 may have a "Y" shape by the second inclined surfaces 49.

The fitting grooves 41 may be pressed by the fitting parts 34 when the fitting parts 34 are fitted therein, respectively. Accordingly, since the fitting part 34 is widened by pressing force applied from the fitting part 34, the cooling channel 40 may be deformed to be bent. Since the fitting part 34 is not completely inserted into the fitting groove 41, a heat transfer rate between the cooling fins 30 and the cooling channel 40 may be reduced.

Further, the cooling channel 40 may be elastically deformed with respect to the fitting grooves 41 and the anti-deformation grooves 43, and the fitting grooves 41 and the anti-deformation grooves 43 may be formed alternately along the stack direction. Accordingly, when the fitting parts 34 are fitted with the fitting grooves 41, the anti-deformation grooves 43 may be narrowed by an interval at which the fitting grooves 41 are widened, and thus, an original shape of the cooling channel 40 may be maintained. Thus, the anti-deformation grooves 43 may prevent deformation of the cooling channel 40, thereby improving a heat transfer rate between the cooling fins 30 and the cooling channel 40.

As illustrated in FIG. 2, the third bolt bores 45 may be disposed on the same line as the first bolt bores 25 and 26 of the end plate 20 and the second bolt bores 36 of the fitting parts 34, and may be formed to allow the bolt 52 to be fastened thereto. The cooling channel 40 may be configured to receive the heat generated by the secondary batteries 11 through the cooling fins 30 and the cartridges 12 to dissipate the heat to the outside to thus indirectly cool the secondary batteries 11. A method for dissipating heat of the cooling channel 40 is not particularly limited. For example, the cooling channel 40 may be disposed to be in contact with the air to cool the secondary batteries 11 through an air cooling system or may be disposed to be in contact with cooling water to cool the secondary batteries 11 through a water cooling system.

The fastening member 50 may fasten the cooling channel 40 and the cooling fins 30 to each other to cause the fitting grooves 41 and the fitting parts 34 to be in abutting contact with each other. For example, the fastening member 50 may include the long bolt 52 by which the end plate 20, the cooling fins 30 and the cooling channel 40 may be screw-fastened to each other, and nuts 54 and 56 configured to fix the long bolt 52.

As illustrated in FIG. 2, the long bolt 52 may be sequentially fastened to the first bolt bores 25 and 26 of the fastening parts 23 and 24, the second bolt bores 36 of the fitting parts 34, and the third bolt bores 45 of the cooling channel 40. The long bolt 52 may have a predetermined length with a first end that protrudes toward the exterior of the fastening part 23 of the first end plate 21 and a second end that protrudes toward the exterior of the fastening part 24 of the second end plate 22. The bolt 52 may cause the fastening parts 23 and 24, the fitting parts 34 and the cooling channel 40 to come into abutting contact with each other through screw-coupling.

As illustrated in FIG. 2, the pair nuts 54 and 56 are provided and the nut 54 may be fastened to a first end of the long bolt 52 to abut an outer side surface of the fastening part 23 of the first end plate 21, and the nut 56 may be fastened to a second end of the long bolt 52 to abut an outer side surface of the fastening part 24 of the second end plate 22. The nuts 54 and 56 may thud fix the long bolt 52 to prevent separation of the long bolt 52 from the bolt bores 25, 26, 36 and 45.

In a battery module according to the present disclosure, cooling fins and a cooling channel may be fitted with each other such that the cooling fins and the cooling channel are in close contact with each other, heat generated by secondary batteries may be effectively transferred to the cooling channel using the cooling fins, and thus, cooling performance of the secondary batteries may be improved.

The above description is merely illustrative description of the technical spirit of the present disclosure, and various modifications and deformations may be derived by those skilled in the art to which the present disclosure pertains without departing from the essential feature of the present disclosure. Thus, the exemplary embodiments that are disclosed in the present disclosure are not for limiting but for describing the technical spirit of the present disclosure, and the scope of the technical spirit of the present disclosure is not limited by the exemplary embodiments. The protection scope of the present disclosure should be interpreted by the appended claims and all the technical spirit corresponding to the equivalents thereof should be interpreted to be included in the scope of a right of the present disclosure.

What is claimed is:

1. A battery module, comprising:
    a battery stack having a plurality of secondary batteries stacked on each other in multiple stages along a predetermined stack direction;
    at least one cooling fin having a contact part disposed to contact at least one of the secondary batteries and a fitting part that extends from the contact part to expose at least a portion of the fitting part to an exterior of the battery stack; and
    a cooling channel having at least one fitting groove into which the fitting part is fitted and which is formed on a first surface of the cooling channel which faces the battery stack, and at least one anti-deformation groove is formed on a second surface of the cooling channel that is opposite to the first surface and has a shape that is symmetrical to the fitting groove.

2. The battery module of claim 1, wherein the contact part is interposed between a pair of secondary batteries disposed adjacent to each other among the secondary batteries.

3. The battery module of claim 1, wherein the fitting groove and the anti-deformation groove are formed alternately along the stack direction.

4. The battery module of claim 1, wherein the fitting groove has at least one first inclined surface formed at an end of the fitting groove, which is connected to the first surface of the cooling channel, to be inclined, and wherein the anti-deformation groove has at least one second inclined surface formed at an end of the anti-deformation groove, which is connected to the second surface of the cooling channel, to be inclined.

5. The battery module of claim 1, further comprising:
    a plurality of cartridges that accommodate at least one of the secondary batteries, respectively, and are stacked on each other in multiple stages along the stack direction.

6. The battery module of claim 5, wherein the fitting part passes through any one of the cartridges to extend to the exterior of the battery stack.

7. The battery module of claim 5, wherein the fitting part passes between a pair of cartridges disposed adjacent to each other among the cartridges to extend to the exterior of the battery stack.

8. The battery module of claim 5, wherein the cooling channel is disposed extraneous to the battery stack to contact the cartridges.

9. A battery module, comprising:
a battery stack having a plurality of secondary batteries stacked on each other in multiple stages along a predetermined stack direction;
at least one cooling fin having a contact part disposed to contact at least one of the secondary batteries and a fitting part that extends from the contact part to expose at least a portion of the fitting part to an exterior of the battery stack;
a cooling channel having at least one fitting groove into which the fitting part is fitted;
a fastening member configured to fasten the cooling channel and the fitting part to each other such that the fitting groove abuts the fitting part; and
at least one end plate disposed extraneous to the battery stack,
wherein the fastening member includes a bolt by which the cooling channel and the fitting part are screw-coupled to each other,
wherein the end plate includes a fastening part that extends to be disposed on the same line as the fitting part, and
wherein the bold screw-couples the cooling channel, the fitting part, and the fastening part to each other.

* * * * *